US010152556B1

(12) United States Patent
Carlos

(10) Patent No.: US 10,152,556 B1
(45) Date of Patent: Dec. 11, 2018

(54) SEMANTIC MODELING PLATFORM

(71) Applicant: JPMorgan Chase Bank, N.A., New York, NY (US)

(72) Inventor: Edgardo S. Carlos, Livingston, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 660 days.

(21) Appl. No.: 14/688,536

(22) Filed: Apr. 16, 2015

(51) Int. Cl.
*G06F 17/30* (2006.01)
*H04L 29/08* (2006.01)

(52) U.S. Cl.
CPC .. *G06F 17/30917* (2013.01); *G06F 17/30424* (2013.01); *H04L 67/02* (2013.01)

(58) Field of Classification Search
CPC .............. G06F 17/30917; G06F 17/30734
USPC ......................................................... 707/794
See application file for complete search history.

(56) References Cited

U.S. PATENT DOCUMENTS

| | | | | |
|---|---|---|---|---|
| 7,093,200 B2 * | 8/2006 | Schreiber | .......... | G06F 17/30557 707/E17.032 |
| 7,823,123 B2 * | 10/2010 | Sabbouh | .......... | G06F 17/30893 717/106 |
| 8,429,179 B1 * | 4/2013 | Mirhaji | .......... | G06F 17/30312 707/756 |
| 8,433,715 B1 * | 4/2013 | Mirhaji | .......... | G06F 17/30312 707/756 |
| 9,542,647 B1 * | 1/2017 | Mirhaji | .......... | G06F 17/30312 |
| 2003/0179228 A1 * | 9/2003 | Schreiber | .......... | G06F 17/30557 715/738 |
| 2004/0230572 A1 * | 11/2004 | Omoigui | .......... | G06F 17/30528 |
| 2006/0156253 A1 * | 7/2006 | Schreiber | .......... | G06F 17/30557 715/835 |
| 2007/0233641 A1 * | 10/2007 | Chong | .......... | G06F 17/30407 |
| 2010/0070448 A1 * | 3/2010 | Omoigui | .......... | H01L 27/1463 706/47 |
| 2011/0078698 A1 * | 3/2011 | Lee | .......... | G06F 17/30734 718/104 |
| 2013/0246049 A1 * | 9/2013 | Mirhaji | .......... | G06F 17/30312 704/9 |
| 2013/0275448 A1 * | 10/2013 | Mirhaji | .......... | G06F 17/30312 707/756 |
| 2014/0180868 A1 * | 6/2014 | Kanigsberg | ....... | G06F 17/30867 705/26.7 |
| 2015/0286713 A1 * | 10/2015 | Zhang | .......... | G06N 5/02 707/749 |
| 2017/0185674 A1 * | 6/2017 | Tonkin | .......... | G06F 17/30734 |

* cited by examiner

*Primary Examiner* — Sheree N Brown
(74) *Attorney, Agent, or Firm* — Greenblum & Bernstein, P.L.C.

(57) ABSTRACT

A semantic modeling platform is disclosed for creating and modifying data objects to better accommodate data in databases and/or web services. The platform creates an ontology based on the data and compares it to the ontology of the data object, such as a database table or web services instance. Based on the comparison the platform modifies the ontology, which is used to create or modify the data object.

18 Claims, 7 Drawing Sheets

```
<xsd:element name="ConvertPBToNonPBClientRequest"
    type="tns:ConvertPBToNonPBClientRequest" />
<xsd:complexType name="ConvertPBToNonPBClientRequest">    ← 610
    <xsd:complexContent>
        <xsd:extension base="pbmw:ServiceRequest">
            <xsd:sequence>
                <xsd:element name="client"
                    type="pbcore:Client" minOccurs="0" maxOccurs="unbounded" />
            </xsd:sequence>
        </xsd:extension>
    </xsd:complexContent>
</xsd:complexType>

<xsd:element name="ConvertPBToNonPBClientResponse"
    type="tns:ConvertPBToNonPBClientResponse" />
<xsd:complexType name="ConvertPBToNonPBClientResponse">    ← 610
    <xsd:complexContent>
        <xsd:extension base="pbmw:ServiceResponse">
            <xsd:sequence>
                <xsd:element name="client"
                    type="pbcore:Client" minOccurs="0" maxOccurs="unbounded" />
            </xsd:sequence>
        </xsd:extension>
    </xsd:complexContent>
</xsd:complexType>
```

SEMANTIC MODELING PLATFORM

FIELD OF THE INVENTION

Embodiments of the present invention are related generally to systems and methods for updating data objects to better accommodate different data concepts by utilizing semantic data modeling to generate an ontology.

BACKGROUND OF THE INVENTION

Corporations often utilize web services, databases, and other remote hosting systems to exchange electronic information with customers, clients, and other organizations. For example, financial institutions, such as banks and investment advisors, often provide web services that allow direct communication between the financial institution and its customers. Individual web services instances are interoperable and can be used in combination with other web services instances to perform complex transactions. To meet ever-changing business needs, these systems must be adaptable. Further, they must be able to incorporate, organize, and present new information in a meaningful way.

Often, a business analyst identifies a need for new or augmented functionality in the remote hosting systems to provide a better product or service to the corporation's customers. The business analyst typically creates a business case report that must be interpreted and translated by a technical analyst, who then generates a data object that can be incorporated in the existing system to provide the desired functionality. This can be a time intensive and laborious process. Moreover, business analysts and technical analyst often do not "speak the same language," so to speak, and frequently present information to one another in a way that inhibits satisfying business needs and technical needs at the same time.

Some organizations have created a manual throughput process in an attempt to streamline the creation or modification of the data object. For example, a business analyst usually creates a set of sample data that is pertinent to the desired functionality. A computerized system is then used to develop an object-relation model that extracts concepts from the sample data. Next, a technical analyst creates an ontology based on the object-relation model to aid in the creation of the data object. The ontology is then used to create or modify the data object. While this process does provide some efficiencies, it is still labor intensive.

Accordingly, there is an essential need for a solution that can overcome the deficiencies of the prior art, whereby a data object can be updated or created by the automatic utilization of semantic modeling to create an ontology.

SUMMARY OF THE INVENTION

The present invention provides a method for updating or creating a database table. The method includes a step for receiving an indication from a user that a database should be updated to accommodate a certain set of data. The method then parses an ontology associated with a table in the database, creates an ontology that describes the set of data, and maps the parsed ontology on to the created ontology. Additional steps include determining the differences between the ontologies and updating the created ontology based on the differences. The method also includes a step of exporting the created ontology to a data modeler that modifies the database table or creates a new database table.

In another embodiment, the present invention provides a method for updating or creating a web services instance. The method includes steps for receiving an indication from a user that web services should be updated to accommodate a certain set of data and importing a first XSD file associated with the set of data. The method then parses an ontology associated with a web services instance, creates an ontology that describes the set of data based on the first XSD file, and maps the parsed ontology on to the created ontology. Additional steps include determining the differences between the ontologies and updating the created ontology based on the differences. The method also includes a step of exporting the created ontology to a data modeler that creates a second XSD file to modify the web services instance or create a web services instance.

In another aspect of the invention, a semantic modeling platform for updating and/or creating data objects is disclosed. The semantic modeling platform includes a database updating engine and a web services engine. The database updating engine utilizes at least one computer processor for updating and creating a table in one or more databases. The web services engine utilizes at least one computer processor for updating and creating a web service instance.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 6 illustrates an example XSD file that describes data used by a web services updating engine to update a web services instance.

FIG. 7 illustrates an example XSD file that describes data produced by a web services updating engine to update a web services instance.

DETAILED DESCRIPTION OF THE INVENTION

Embodiments of the present invention include systems and methods for creating or updating a data object by utilizing semantic data modeling to generate an ontology.

Figure 1:
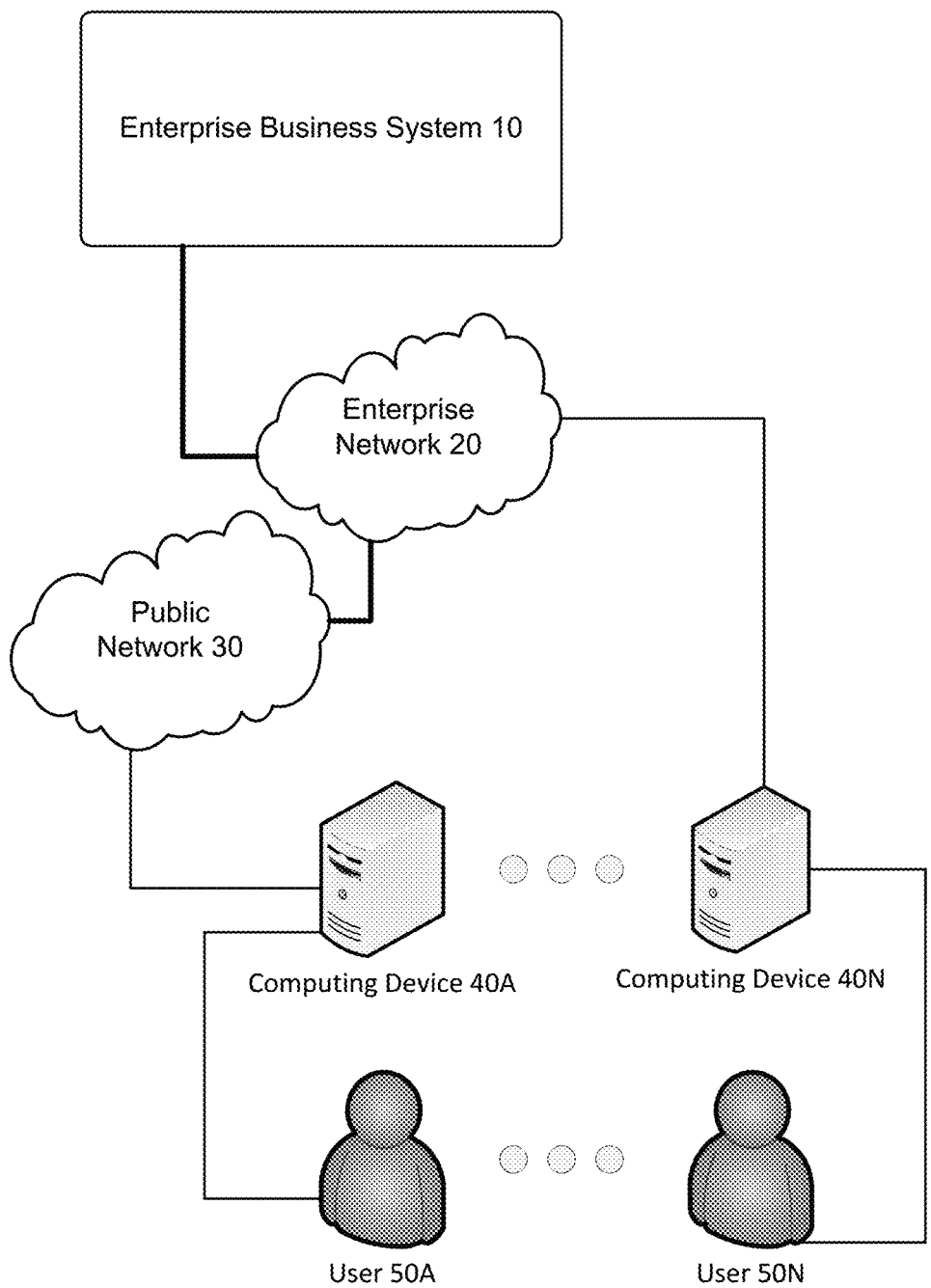
FIG. 1 depicts a block diagram illustrating an enterprise business system in accordance with an embodiment of the present invention.

FIG. 1 depicts a block diagram illustrating an enterprise business system 10 connected to an enterprise network 20. The enterprise network 20 can be connected to a public network 30. A plurality of users 50A-50N (collectively "users 50") may use computing devices 40A-40N (collectively "computing devices 40") to communicate with the enterprise business system 10 over the enterprise network 20 and/or public network 30. Users 50 interact with their respective computing devices 40 to access enterprise business system 10. The enterprise network 20 can be a private local network like a local area network (LAN) or any other type of communication network, including the internet. The public network 30 can be a public network like the internet or any other type of communication network that is separate and distinct from the enterprise network 20. The enterprise business system 10 connects to enterprise network 20. Embodiments of the enterprise business system 10 include enterprise software systems, such as enterprise resource planning systems, financial business systems, resource management systems, inventory management systems, human resources management systems, sales tracking/management systems, as well as other enterprise software systems.

Users 50 may use a variety of different computing devices 40. The computing devices 40 include servers, desktop computers, laptops, tablets, smartphones, smartwatches, or any other type of computing device. The computing devices 40 may communicate with the enterprise business system 10 over enterprise network 20 using a direct access protocol to access the resources of the enterprise business system 10, e.g. directly query the enterprise business system 10's databases. Alternatively, the computing devices 40 may communicate with the enterprise business system 10 over enterprise network 20 through a web portal, dashboard, web services, mobile application, or other information communication program.

Figure 2:
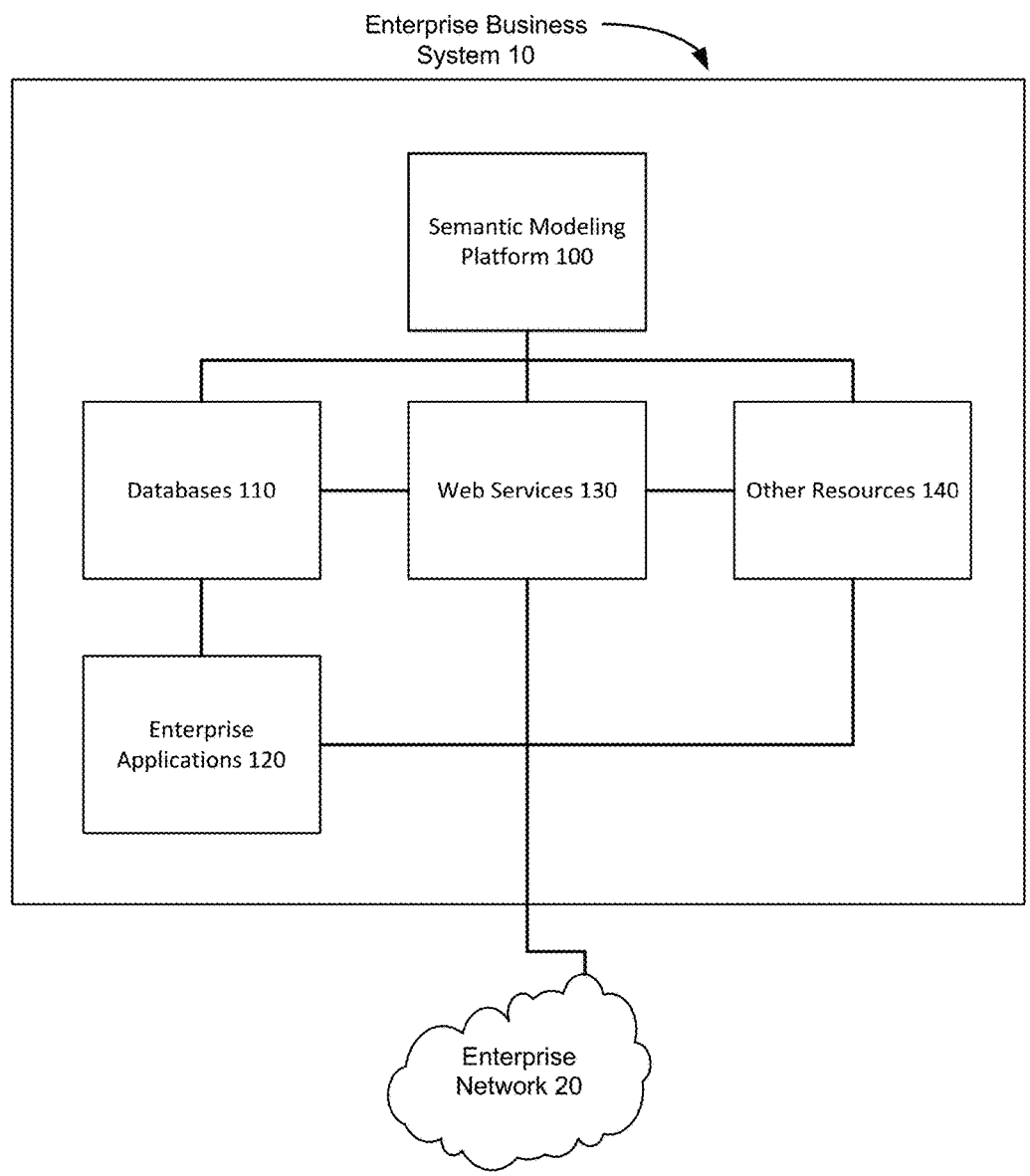
FIG. 2 depicts a block diagram illustrating the components of an enterprise business system in accordance with an embodiment of the present invention.

FIG. 2 depicts a block diagram illustrating the enterprise business system 10 that comprises semantic modeling platform 100, databases 110, enterprise applications 120, web services 130, and other resources 140. The semantic modeling platform 100 generates an ontology using semantic modeling. The semantic modeling platform 100 interfaces with databases 110, web services 130, and other resources 140 to process relevant data and create/modify semantic models to generate the ontology. The databases 110 are structures for organizing collections of data including in-memory databases, active databases, cloud databases, data warehouses, deductive databases, distributed databases, document-oriented databases, embedded databases, end-user databases, federated databases, graph databases, multi-dimensional databases, hypertext databases, knowledge bases databases, mobile databases, operational databases, parallel databases, probabilistic databases, real-time databases, spatial databases, temporal databases, and unstructured databases. The enterprise applications 120 include enterprise specific applications that address specific business or enterprise needs. Such as, for example, an application that combs through customer lists and classifies the type of customer based on certain criteria. The web services 130 provide functionality that allows the enterprise business system 10 to communicate with computing devices 40 via enterprise network 20. The other resources 140 includes other resources that typically comprise an enterprise business system, such as input/output devices, display devices, server and/or processing equipment, and other storage devices.

Figure 3:
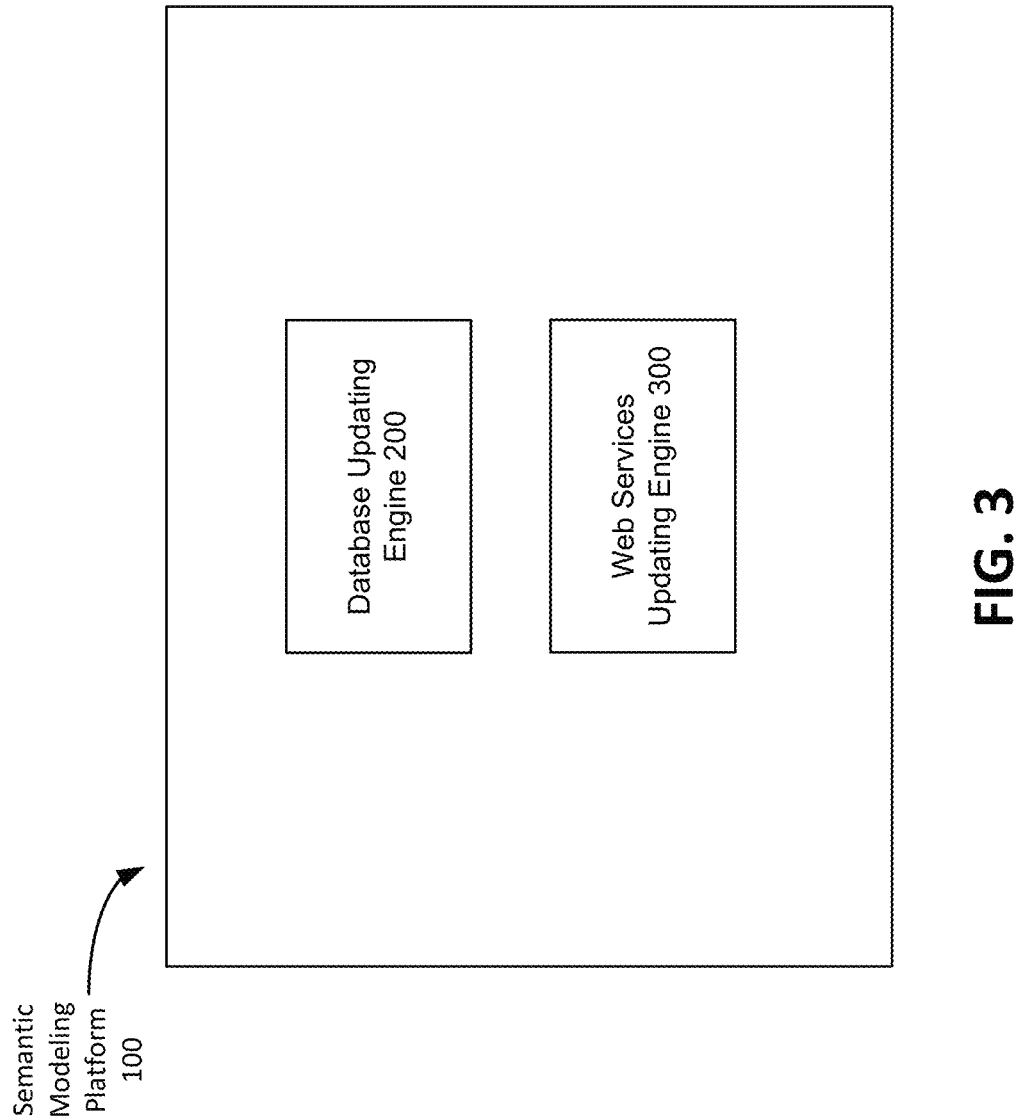
FIG. 3 depicts a block diagram illustrating a semantic modeling platform in accordance with an embodiment of the present invention.

FIG. 3 depicts a block diagram illustrating semantic modeling platform 100 that comprises the database updating engine 200 and the web services updating engine 300. The database updating engine 200 updates the organizational structure of at least one of the databases 110 using an ontology created by semantic modeling. Similarly, the web services updating engine 300 updates at least one instantiation of the web services 130 using an ontology created by semantic modeling.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer-readable media that can form part of the system memory and be read by the processing unit. By way of example, and not limitation, computer-readable media may comprise computer storage media and communication media. The system memory may include computer storage media in the form of volatile and/or nonvolatile memory such as read-only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system, the iOS™ operating system, the Android™ operating system, or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball, or touch pad. Other input devices may include a microphone, joystick, game pad, satellite dish, scanner, voice recognition device, keyboard, touch screen, toggle switch, push button, or the like. These and other input devices are often connected to the processing unit through a user input interface that is coupled to the system bus, but may be connected by other interface and bus structures, such as a parallel port, game port, or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN), and other types of networks. When used in a LAN networking environment, computers may be connected to the LAN through a network interface or adapter. When used in a WAN networking environment, computers typically include a modem or other communication mechanism. Modems may be internal or external and may be connected to the system bus via the user-input interface or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa, or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It should be readily apparent to one of ordinary skill in the art that the presently disclosed invention may be implemented in a wide range of industries including any businesses and institutions that would benefit from a dynamic alert system capable of delivering notifications to customers or account holders in an optimized manner and actively responding to the customer as necessary. In the preferred embodiments, the presently disclosed invention is implemented for use by a financial institution, such as a bank. This is not meant to be limiting in any way. Indeed, the present invention may be implemented in any number of industries.

The various embodiments and features of the presently disclosed invention may be used in any combination, as the combination of these embodiments and features are well within the scope of the invention. While the foregoing description includes many details and specificities, it is to be understood that these have been included for purposes of explanation only and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

Embodiments of the database updating engine 200 will now be discussed in more detail.

Database Updating Engine

Figure 4:
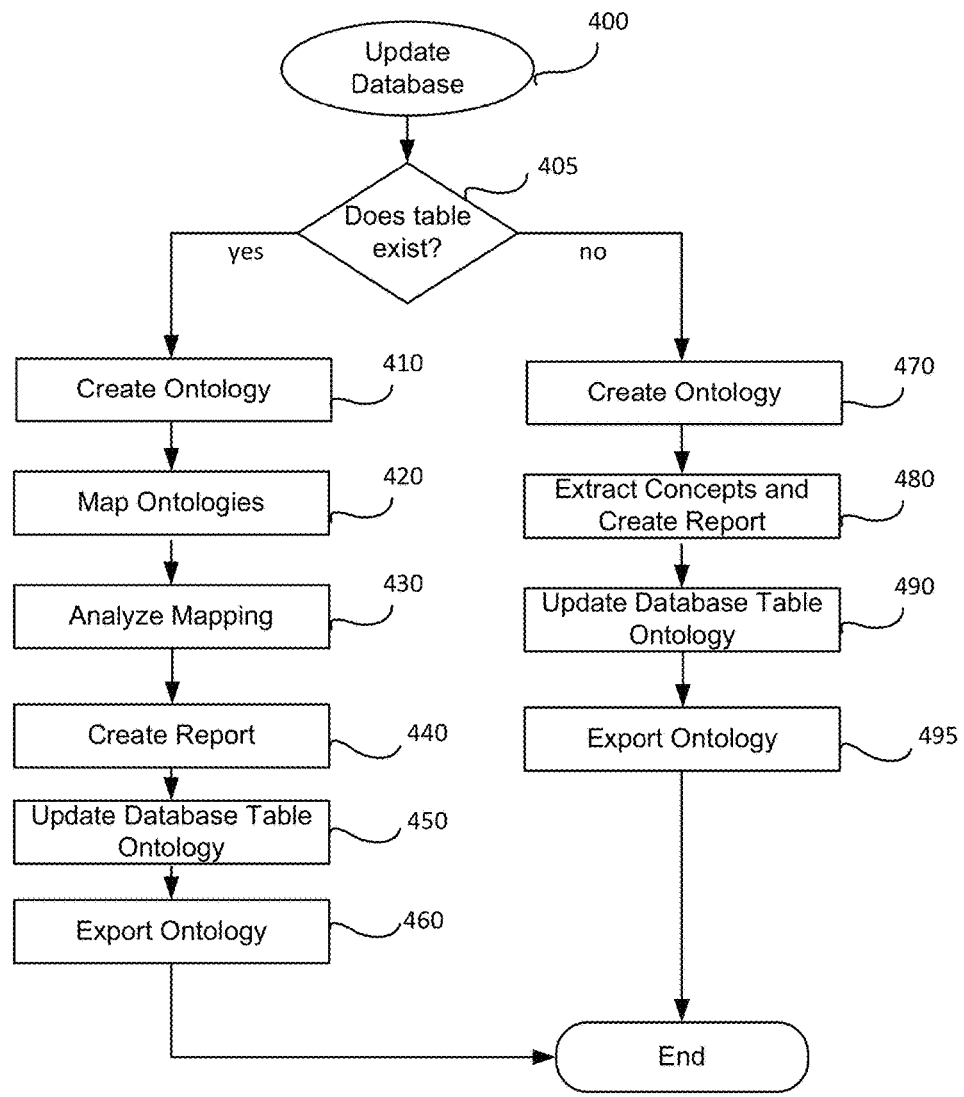
FIG. 4 depicts a method of for creating or updating a table in a database based on an ontology created by semantic modeling in accordance with an embodiment of the present invention.

The database updating engine 200 creates or updates a table in at least one of the databases 110. FIG. 4 shows a method for creating or updating the table based on an ontology created by semantic modeling.

In step 400, an analyst indicates to the semantic modeling platform 100 that at least one of the databases 110 should be updated to better organize indicated data. The analyst can send the indication to the semantic modeling platform 100 using a computing device 40 via enterprise network 20 or using an interface or other means provided by other resources 140. The semantic modeling platform can also scan the data in databases 110 on a periodic or scheduled basis and automatically determine whether the databases 110 should be updated. The semantic modeling platform 100 initiates the database updating engine 200. In step 405, based on the received indication, the database updating engine 200 determines whether the structure of one of the tables in the databases 110 can be updated to address the organizational issue, or whether a new table should be created. The database updating engine 200 can also parse the ontology of an existing table, which is often represented by a knowledge representation language such as Web Ontology Language (OWL), to determine whether the table can be modified or if a new table should be created. If the database updating engine 200 determines that the table can be modified, the method proceeds to step 410. Otherwise, it proceeds to step 470.

In step 410, the database updating engine 200 uses semantic modeling to create an ontology that describes the indicated data. There are many ways to create an ontology using a semantic model. For example, one embodiment involves using R2MRL which expresses customized mappings from relational databases to Resource Description Framework (RDF) datasets. Other semantic modeling methods that map data concepts can also be used.

In step 420, the database updating engine 200 maps the (newly created) ontology that describes the indicated data to the existing ontology that describes the database table. The database updating engine 200 can determine the best mapping based on a number of differing relational criteria. In step 430, the database updating engine 200 analyzes the mapping to determine what information and/or concepts should be included in the database table ontology. In step 440, the database updating engine 200 creates a report that describes the mapping, the differences between the ontologies, and/or a recommendation of changes to the database table ontology. This report can be presented to the analyst or logged for tracking purposes.

In step 450, the database updating engine 200 updates the database table ontology based on its analysis in step 430. The analyst may further modify the updated ontology. In step 460, the database updating engine 200 exports the updated ontology to a data modeler that modifies the table in databases 110. One embodiment includes using the CA Erwin Data Modeler (ERwin) to update database tables.

If, in step 405, database updating engine 200 determines that a new database table should be created, the method proceeds to step 470. In step 470, the database updating engine 200 uses semantic modeling to create an ontology that describes the indicated data. There are many ways to create an ontology using a semantic model, as described in connection with step 420 above.

In step 480, the database updating engine extracts the concepts from the ontology to define the requirements for the new database table. The database updating engine 200 creates a report recommending the structure of the database table. This report can be presented to the analyst or logged for tracking purposes. In step 490, the database updating engine 200 can further update the database table ontology based on analyst input. In step 495, the database updating engine 200 exports the updated ontology to a data modeler that creates the table in databases 110.

Embodiments of the web services updating engine 200 will now be discussed in more detail.

Web Services Updating Engine

Figure 5:
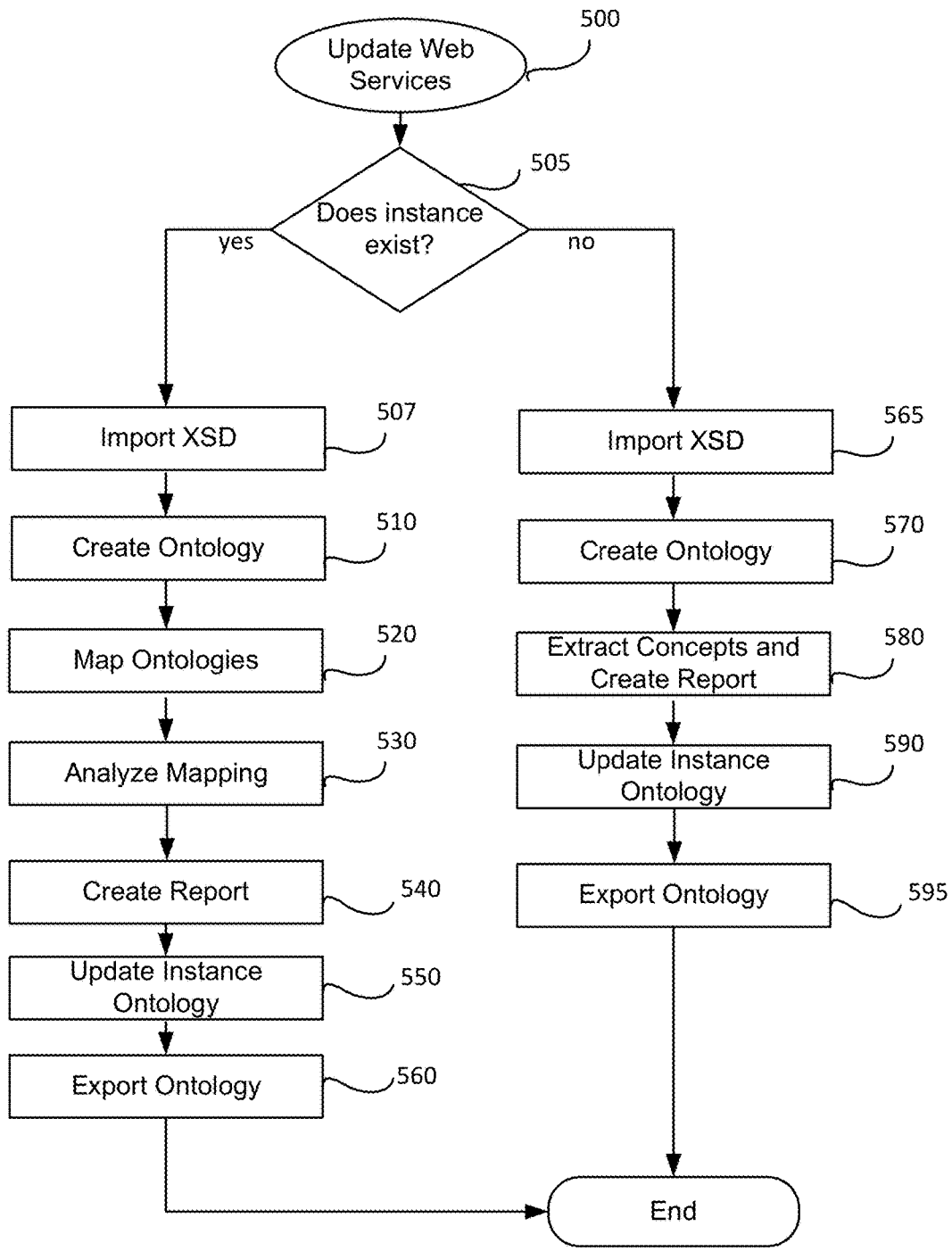
FIG. 5 depicts a method for creating or updating a web services instance based on an ontology created by semantic modeling in accordance with an embodiment of the present invention.

The web services updating engine 300 creates or updates an instance of at least one of the web services 130. FIG. 5 shows a method for creating or updating the instance based on an ontology created by semantic modeling.

In step 500, an analyst indicates to the semantic modeling platform 100 that at least one of the web services 130 should be updated to better facilitate the exchange of indicated data. The analyst can send the indication to the semantic modeling platform 100 using a computing device 40 via enterprise network 20 or using an interface or other means provided by other resources 140. The semantic modeling platform can also scan the data communicated by web services 130 on a periodic or scheduled basis and automatically determine whether the web services 130 should be updated. The semantic modeling platform 100 initiates the web services updating engine 300. In step 505, based on the received indication, the web services updating engine 300 determines whether the structure of one of the web services instances can be updated to better communicate the indicated data, or whether a new instance should be created. The web services updating engine 300 can also parse the ontology of an existing web services instance, which is often represented by a knowledge representation language such as OWL, to determine whether the instance can be modified or if a new instance should be created. If the web services updating engine 300 determines that the instance can be modified, the method proceeds to step 507. Otherwise, it proceeds to step 565.

In step 507, the web services updating engine 300 imports an XML Schema Definition (XSD) file associated with the indicated data. In step 510, the web services updating engine 300 uses semantic modeling to create an ontology that describes the indicated data based on the XSD file. There are many ways to create an ontology using a semantic model. For example, one embodiment involves using R2MRL which expresses customized mappings from relational databases to Resource Description Framework (RDF) datasets. Other semantic modeling methods that map data concepts can also be used.

In step 520, the web services updating engine 300 maps the ontology that describes the indicated data to the ontology that describes the web services instance. The web services updating engine 300 can determine the best mapping based on a number of differing relational criteria. In step 530, the web services updating engine 300 analyzes the mapping to determine what information and/or concepts should be included in the web services instance ontology. In step 540, the web services updating engine 300 creates a report that describes the mapping, the differences between the ontologies, and/or a recommendation of changes to the web services instance ontology. This report can be presented to the analyst or logged for tracking purposes.

In step 550, the web services updating engine 300 updates the web services instance ontology based on its analysis in step 530. The analyst may further modify the updated ontology. In step 560, the web services updating engine 300 exports the updated ontology to a data modeler that modifies the instance in web services 130. One embodiment includes using a Java engine to create an XSD to update the web services instance.

If, in step 505, web services updating engine 300 determines that a new web services instance should be created, the method proceeds to step 565. In step 565, the web services updating engine 300 imports an XSD file associated with the indicated data. In step 570, the web services updating engine 300 uses semantic modeling to create an ontology that describes the indicated data. There are many ways to create an ontology using a semantic model, see step 520 above.

In step 580, the web services updating engine 300 extracts the concepts from the ontology to define the requirements for the new web services instance. The web services updating engine 300 creates a report recommending changes to the web services instance ontology. This report can be presented to the analyst or logged for tracking purposes. In step 590, the web services updating engine 300 can further update the web services instance ontology based on analyst input. In step 595, the database updating engine 300 exports the updated ontology to a data modeler that creates the instance in web services 130.

Figure 7:
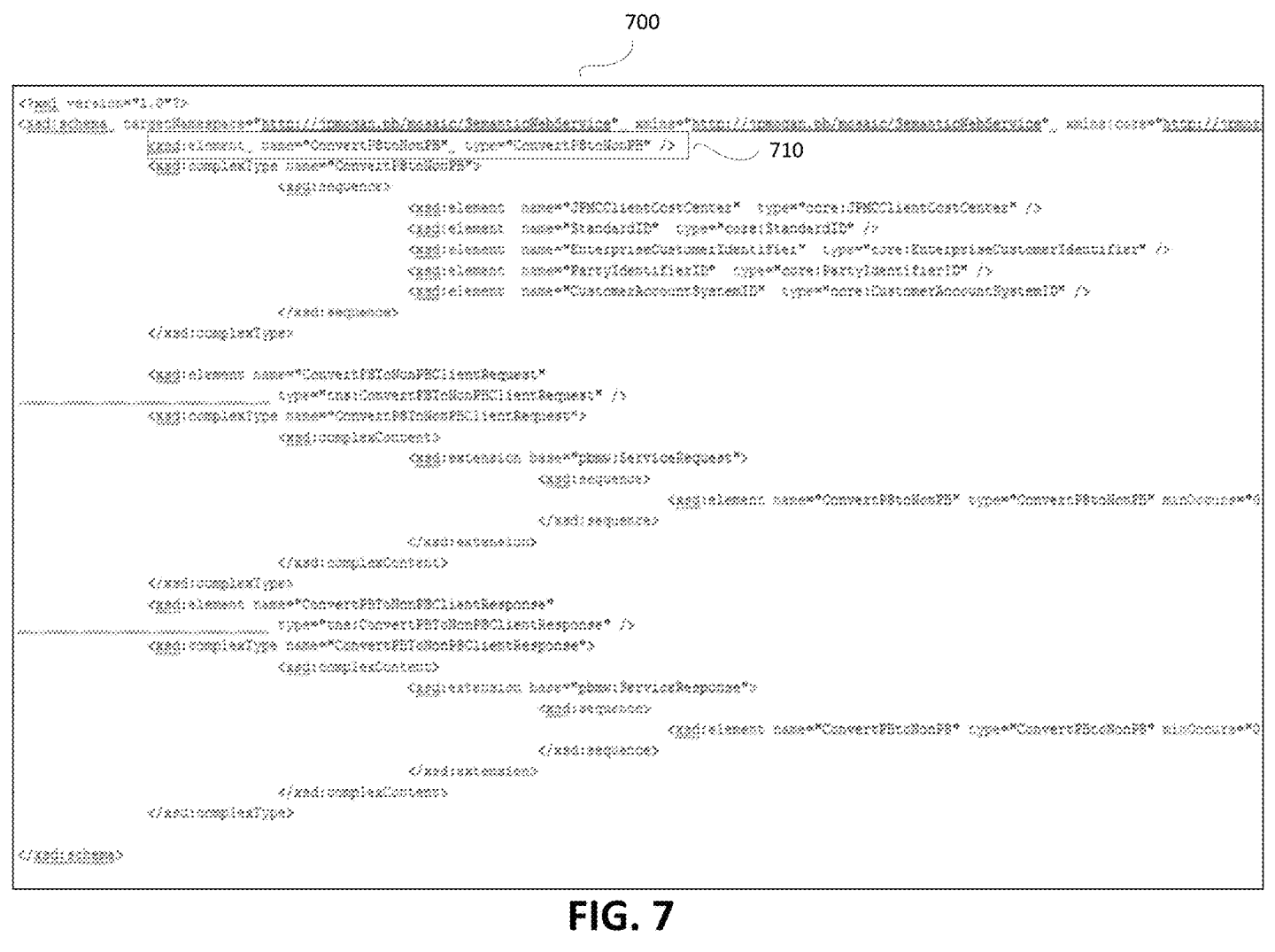

In one embodiment, FIG. 6 shows an exemplary XSD file 600 that describes data with an element type 610, labeled "ConvertPBToNonPBClientRequest." An analyst indicates to the semantic modeling platform 100 that web services 130 should accommodate data associated with this file. The web services updating engine 300 determines that a new web services instance should be created and uses semantic modeling to create an ontology for the indicated data. A report is created and presented to the analyst that recommends changes to the web services instance ontology. The web services updating engine 300 exports the updated ontology to a data modeler that generates the XSD file 700 in FIG. 7 that is used to create the instance in web services 130. Note that the XSD file indicates that the web services instance now includes a "ConvertPBToNonPBClientRequest" type 710.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A semantic modeling platform comprising a memory with programmed instructions stored thereon and one or more processors configured to execute the stored programmed instructions to:
   scan one or more databases to determine when at least one of the one or more databases is ready to update;
   receive an indication for updating at least one of the one or more databases to accommodate data, when the determination indicates that the at least one of the one or more databases is ready to update;
   parse a first ontology associated with at least one table in the at least one of the one or more databases;
   create a second ontology that describes the data is accommodated;
   map the parsed first ontology on to the created second ontology;
   analyze the mapping of the first ontology on to the created second ontology;
   determine one or more differences between the first and the second ontologies based on the analyzing;
   recommend one or more changes to the second ontology based on the determined one or more differences between the first and the second ontologies; and
   update the created second ontology based on the recommended one or more changes to the second ontology.

2. The semantic modeling platform of claim 1, wherein the-executable code when executed by the one or more processors further causes the one or more processors to:
   export the updated ontology to a data modeler that modifies the at least one table in the database or creates a new table in the database.

3. The semantic modeling platform of claim 2, wherein the-executable code when executed by the one or more processors further causes the one or more processors to:
   map the parsed first ontology on to the created second ontology based on a plurality of relational criteria.

4. The semantic modeling platform of claim 3, wherein the-executable code when executed by the one or more processors further causes the one or more processors to:
   recommend one or more changes to the parsed first ontology based on the determined one or more differences between the first and the second ontologies.

5. The semantic modeling platform of claim 1, wherein the executable code when executed by the one or more processors further causes the one or more processors to:
   receive an input indicating one or more web services are updated to accommodate data;
   parse a first ontology associated with at least one of the one or more web services;
   create a second ontology that describes the data based on the first XSD file;
   map the parsed first ontology on to the created second ontology;
   determine one or more differences between the first and the second ontologies;
   update the created second ontology based on the determined differences between the first and the second ontologies; and
   export the updated ontology to a data modeler that creates and utilizes a second XSD file to modify the one or more web services or create a new web service.

6. The semantic modeling platform of claim 1, wherein the executable code when executed by the one or more processors further causes the one or more processors to:

receive an indication to update one or more web services to accommodate data;
import a first XSD file associated with the data;
parse a third ontology associated with at least one web services instance;
create a fourth ontology that describes the data based on the first XSD file;
map the parsed third ontology on to the created fourth ontology;
determine one or more differences between the third and the fourth ontologies;
update the created fourth ontology based on the determined differences between the third and the fourth ontologies; and
export the updated ontology to a data modeler that creates and utilizes a second XSD file to modify the web services instance or creates a web services instance.

7. A method for updating an ontology in a database, the method comprising:
scanning, by a semantic modeling platform, one or more databases to determine when at least one of the one or more databases is ready to update;
receiving, by the semantic modeling platform, an indication for updating at least one of the one or more databases to accommodate data, when the determination indicates that the at least one of the one or more databases is ready to update;
parsing, by the semantic modeling platform, a first ontology associated with at least one table in the at least one of the one or more databases;
creating, by the semantic modeling platform, a second ontology that describes the data to is accommodated;
mapping, by the semantic modeling platform, the parsed first ontology on to the created second ontology;
analyzing, by the semantic modeling platform, the mapping of the first ontology on to the created second ontology;
determining, by the semantic modeling platform, one or more differences between the first and the second ontologies based on the analyzing;
recommending, by the semantic modeling platform, one or more changes to the second ontology based on the determined one or more differences between the first and the second ontologies; and
updating, by the semantic modeling platform, the created second ontology based on the recommended one or more changes to the second ontology.

8. The method of claim 7, further comprising:
exporting, by the semantic modeling platform, the updated ontology to a data modeler that modifies the at least one table in the database or creates a new table in the database.

9. The method of claim 8, further comprising:
mapping, by the semantic modeling platform, the parsed first ontology on to the created second ontology is based on a plurality of relational criteria.

10. The method of claim 9, further comprising:
recommending, by the semantic modeling platform, one or more changes to the parsed first ontology based on the determined one or more differences between the first and the second ontologies.

11. The method of claim 7, further comprising:
receiving, by the semantic modeling platform, an input indicating one or more web services are updated to accommodate data;
parsing, by the semantic modeling platform, a first ontology associated with at least one of the one or more web services;
creating, by the semantic modeling platform, a second ontology that describes the data based on the first XSD file;
mapping, by the semantic modeling platform, the parsed first ontology on to the created second ontology;
determining, by the semantic modeling platform, one or more differences between the first and the second ontologies;
updating, by the semantic modeling platform, the created second ontology based on the determined differences between the first and the second ontologies; and
exporting, by the semantic modeling platform, the updated ontology to a data modeler that creates and utilizes a second XSD file to modify the one or more web services or create a new web service.

12. The method of claim 7, further comprising:
receiving, by the semantic modeling platform, an indication to update one or more web services to accommodate data;
importing, by the semantic modeling platform, a first XSD file associated with the data;
parsing, by the semantic modeling platform, a third ontology associated with at least one web services instance;
creating, by the semantic modeling platform, a fourth ontology that describes the data based on the first XSD file;
mapping, by the semantic modeling platform, the parsed third ontology on to the created fourth ontology;
determining, by the semantic modeling platform, one or more differences between the third and the fourth ontologies;
updating, by the semantic modeling platform, the created fourth ontology based on the determined differences between the third and the fourth ontologies; and
exporting, by the semantic modeling platform, the updated ontology to a data modeler that creates and utilizes a second XSD file to modify the web services instance or creates a web services instance.

13. A non-transitory machine readable medium having stored thereon instructions for updating an ontology in a database comprising executable code which when executed by one or more processors, causes the one or more processors to:
scan one or more databases to determine when at least one of the one or more databases is ready to update;
receive an indication for updating at least one of the one or more databases to accommodate data, when the determination indicates that the at least one of the one or more databases is ready to update;
parse a first ontology associated with at least one table in the at least one of the one or more databases;
create a second ontology that describes the data to is accommodated;
map the parsed first ontology on to the created second ontology;
analyzing the mapping of the first ontology on to the created second ontology;
determine one or more differences between the first and the second ontologies based on the analyzing;
recommend one or more changes to the second ontology based on the determined one or more differences between the first and the second ontologies; and
update the created second ontology based on the recommended one or more changes to the second ontology.

14. The non-transitory machine readable medium of claim 13, wherein the executable code when executed by the processors further causes the one or more processors to:
   export the updated ontology to a data modeler that modifies the at least one table in the database or creates a new table in the database.

15. The non-transitory machine readable medium of claim 14, wherein the executable code when executed by the processors further causes the one or more processors to:
   map the parsed first ontology on to the created second ontology based on a plurality of relational criteria.

16. The non-transitory machine readable medium of claim 15, wherein the executable code when executed by the processors further causes the one or more processors to:
   recommend one or more changes to the parsed first ontology based on the determined one or more differences between the first and the second ontologies.

17. The non-transitory machine readable medium of claim 13, wherein the executable code when executed by the processors further causes the one or more processors to:
   receive an input indicating one or more web services are updated to accommodate data;
   parse a first ontology associated with at least one of the one or more web services;
   create a second ontology that describes the data based on the first XSD file;
   map the parsed first ontology on to the created second ontology;
   determine one or more differences between the first and the second ontologies;
   update the created second ontology based on the determined differences between the first and the second ontologies; and
   export the updated ontology to a data modeler that creates and utilizes a second XSD file to modify the one or more web services or create a new web service.

18. The non-transitory machine readable medium of claim 13, wherein the executable code when executed by the processors further causes the one or more processors to:
   receive an indication to update one or more web services to accommodate data;
   import a first XSD file associated with the data;
   parse a third ontology associated with at least one web services instance;
   create a fourth ontology that describes the data based on the first XSD file;
   map the parsed third ontology on to the created fourth ontology;
   determine one or more differences between the third and the fourth ontologies;
   update the created fourth ontology based on the determined differences between the third and the fourth ontologies; and
   export the updated ontology to a data modeler that creates and utilizes a second XSD file to modify the web services instance or creates a web services instance.

* * * * *